Patented Dec. 6, 1932

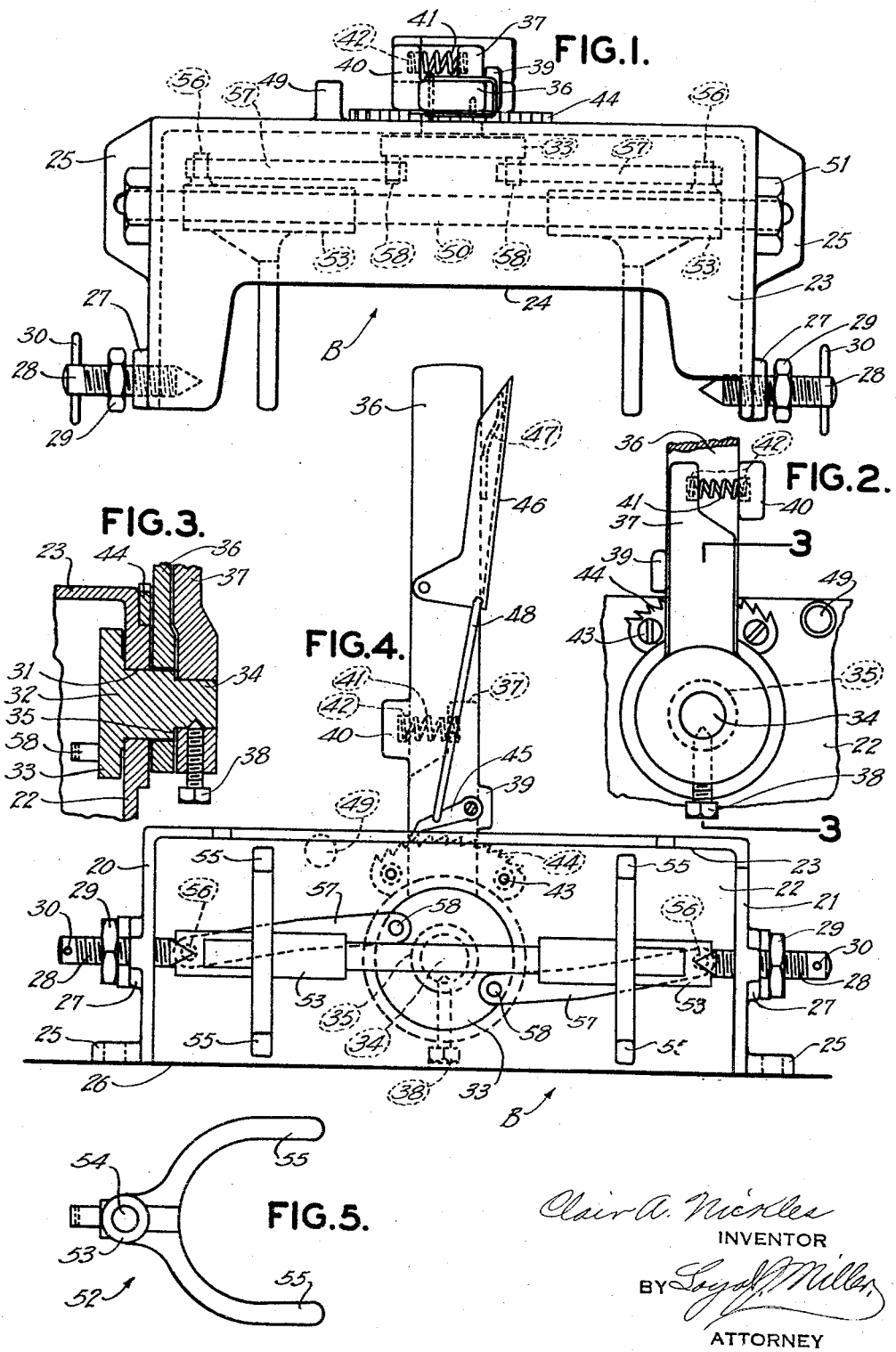

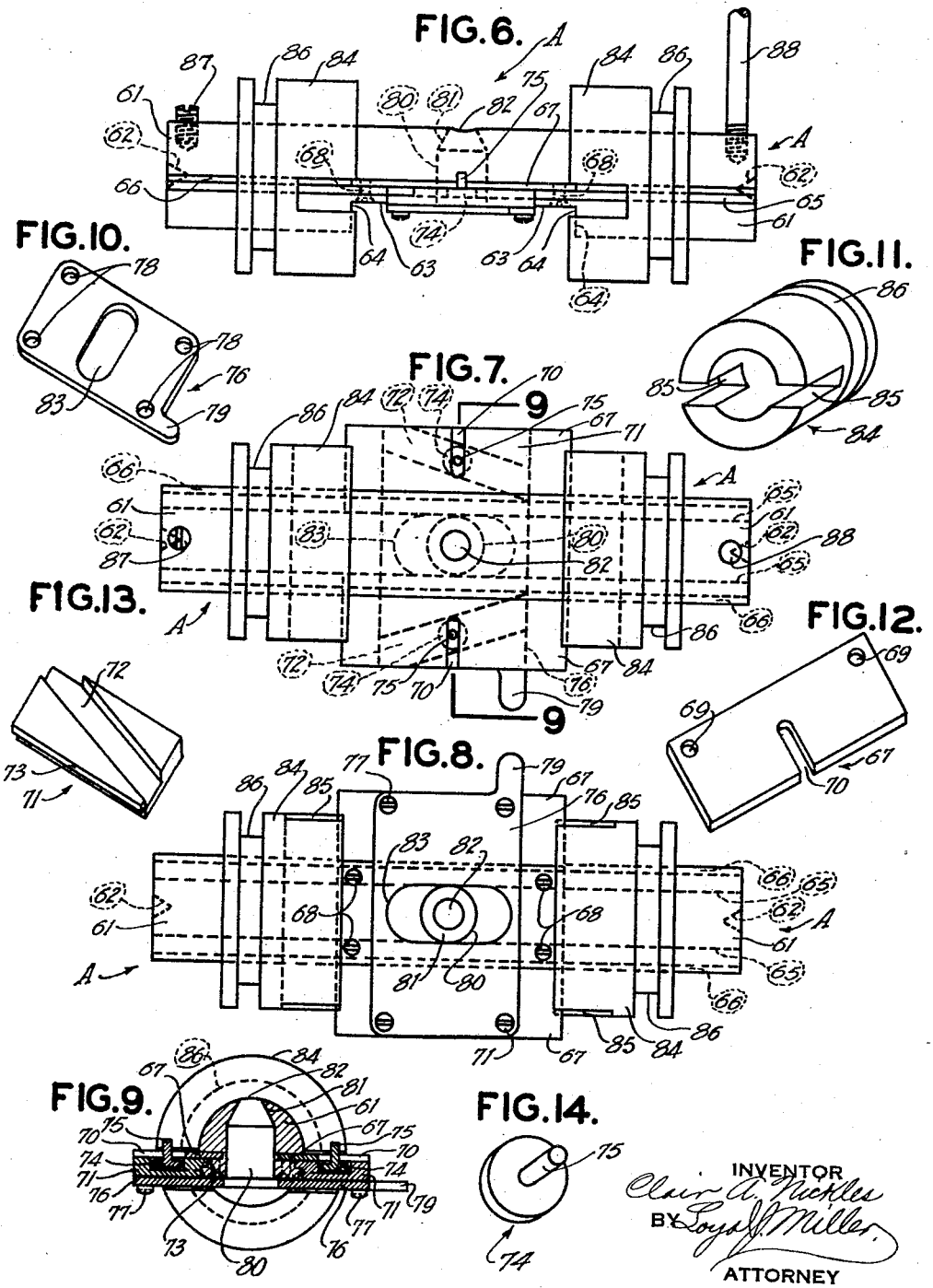

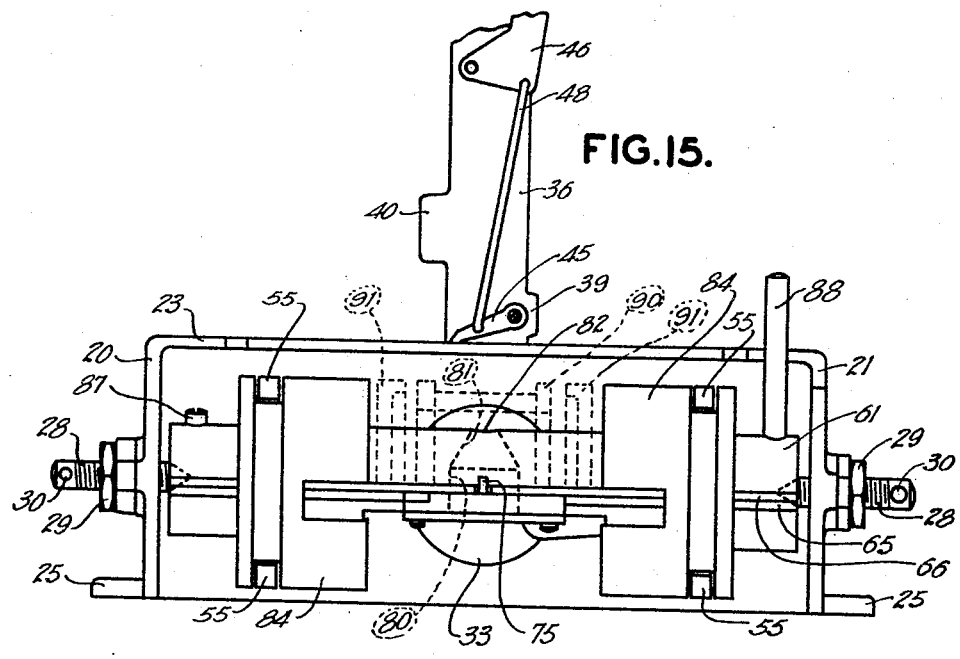
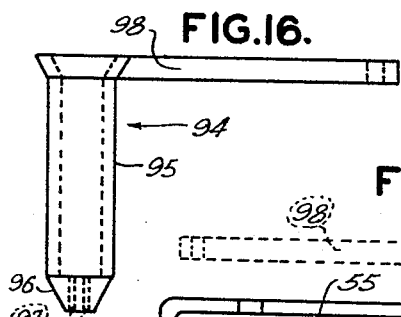
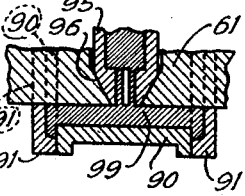
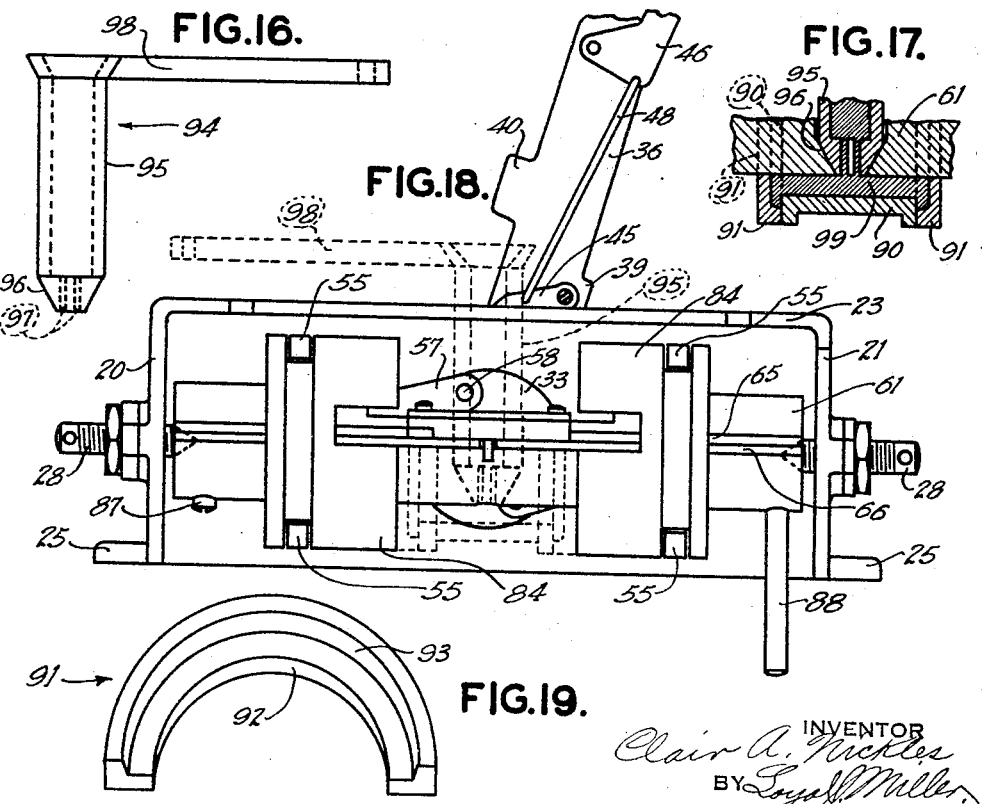
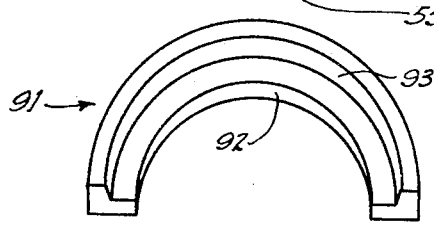

1,889,999

UNITED STATES PATENT OFFICE

CLAIR A. NICKLES, OF PONCA CITY, OKLAHOMA

BEARING BABBITTING DEVICE

Application filed March 2, 1931. Serial No. 519,379.

My invention relates to apparatus for babbitting bearings.

The objects of my invention are to provide a device of this class which is new, novel, practical and of utility; which will act as a form for holding the bearing while the babbitt is being poured; which will not only hold the bearing, but will embody means for properly alining the bearing with the form before the babbitt is poured; each one of which will accommodate bearings of a given diameter and also of various lengths; which will accommodate a bearing base as well as a bearing cap; which will be extremely simple in operation and installation; which will be strong and durable; which will permit the use of unskilled labor in pouring bearings, and when such labor is used, make it possible for them to produce in as great a capacity and quality as if skilled labor had been used; which will permit either class of labor to produce at a greater capacity than is now possible; and, which will be efficient in accomplishing all the purposes for which it is intended.

With these and other objects in view as will more fully appear, my invention consists in the construction, novel features, and combination of parts hereinafter more fully described, pointed out in the claims hereto appended, and illustrated in the accompanying three sheets of drawings, of which:

Figure 1 is a plan view of the housing which supports the bearing engaging mechanism;

Fig. 2 is a detail fragmentary elevational view of the lever arm upon the rear of the housing;

Fig. 3 is a vertical sectional view taken along the line 3—3 of Fig. 2;

Fig. 4 is a front elevational view;

Fig. 5 is a detail of one of the bifurcated yokes carried by said housing for actuating a portion of the bearing engaging mechanism;

Fig. 6 is a front side elevational view of the bearing engaging mechanism removed from the housing, and shown in position for receiving the bearing;

Fig. 7 is a plan view of the mechanism shown in Fig. 6;

Fig. 8 is a bottom view of the mechanism shown in Figs. 6 and 7;

Fig. 9 is a vertical sectional view taken along the line 9—9 of Fig. 7;

Figs. 10, 11, 12, 13 and 14 are detail perspective views of parts of the bearing engaging mechanism;

Fig. 15 is a front elevational view of the bearing engaging mechanism within the housing, and showing in dotted lines a bearing and its end forms ready for engagement;

Fig. 16 is an elevational view of the funnel for directing the babbitt into place;

Fig. 17 is a detail vertical sectional view of a poured bearing, and showing the lower portion of the funnel in operative position;

Fig. 18 is a view similar to Fig. 15, but showing the bearing in a position to be poured, and also showing the funnel in operative position; the bearing, its end forms, and the funnel being depicted in dotted lines; and, Fig. 19 is a detail perspective view of one of the side forms for the bearing.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One practical embodiment of the invention as illustrated in the drawings follows:

The device consists in two main elements, one being a bearing engaging element A and the other being a housing B and its attached mechanism for supporting said element A.

I now refer more particularly to Figs. 1 to 5 inclusive, which show said element B. Said element B consists of a substantially rectangular metal housing having an open bottom, closed end walls 20 and 21, a closed back or rear side wall 22, an open front side, and a top 23 which is partially cut away at its front edge as shown at 24. The lower portions of the end walls 20 and 21 are each provided with an outwardly extending flange 25 through which bolts or screws may be inserted for rigidly attaching the housing to a suitable base or table top 26. At substantially the vertical mid-point of each of said ends 20 and 21 and at a point adjacent their front edges, is provided a centrally perforated interiorly threaded boss 27, each adapted to receive an exteriorly threaded spindle 28 the point of which extends into the interior of said housing B, and the outer end of which is provided with a lock-nut 29 and a transverse pin 30. The spindles 28 are positioned in axial alinement with each other, and the pins 30 are provided as a means for assisting in their manual rotation.

At substantially its mid-point longitudinally and vertically said rear wall 22 is provided with a circular bore 31, best seen in Fig. 3. The bore 31 receives rotatably, a short shaft 32 which extends outwardly through the rear wall 22, and the inner end of which is rigidly attached to or made integral with a disc 33. The outer portion of said shaft 32 is abruptly reduced in diameter as shown at 34 and a shoulder 35 is formed by such reduced portion. Upon the larger portion of the shaft 32, but not keyed thereto, is provided the lower end of a long lever arm 36, while upon the reduced portion of said shaft 32 is provided a short lever arm 37, which is rigidly attached to the shaft 32 by a set-screw, or the like, 38. Said arm 36 is provided upon its right hand edge, looking from the front of housing B, with a rearwardly extending integral lug 39 which contacts the right hand edge of the arm 37 and causes the arm 37 to be moved with the arm 36 when said arm 36 is moved toward the left. The left hand edge of said arm 36, at a point adjacent the upper end of the arm 37 is provided with a rearwardly extending lug 40. Between said lug 40 and the upper end of the arm 37 is provided a compression spring 41, the opposite ends of which are seated in superficial cylindrical seats 42. Said spring 41 acts as a means for forcing the arm 37 to travel with said arm 36 in a right hand direction unless retarding pressure is exerted upon said disc 33 to a degree greater than the strength of the spring 41, at which time a slight movement of the arm 36 will be permitted in a right hand direction without a similar movement of said arm 37.

Between the rear face of said rear wall 22 and the front face of the arm 36, and rigidly attached to said rear wall 22 by bolts or pins 43, is provided an arcuate, toothed rack 44. Pivotally mounted upon the front face of the arm 36 and adapted to engage the teeth of said rack 44, is provided a pawl 45. The upper portion of said arm 36 is provided with a pivotally mounted handle 46 which envelopes the right hand edge of the arm 36 and which is normally held away from said edge by a flat spring 47. Said handle 46 is connected to the pawl 45 by a link 48 in such a manner that when the handle 46 is manually pressed against said arm 36, the pawl 45 will be raised from engagement with the rack 44, and in such a manner that normally, the outward pressure of said spring 47 will hold the pawl 45 in engagement with the rack 44.

Outstanding from said rear wall 22 is further provided a lug 49 which acts as a means for limiting the throw of the arm 36 in a left hand direction.

Extending longitudinally through said housing between the end walls 20 and 21, at substantially their vertical mid-points, is a rod 50 which is held rigidly in place by nuts 51. Slidably mounted within the housing upon rod rod 50 are a pair of yokes 52, one of which is shown in detail in Fig. 5. Said yokes 52 each comprises a substantially cylindrical portion 53 having a longitudinal bore 54 which receives said rod 50, and a pair of tines 55 which extend toward the front of said housing. Said tines 55 of each yoke 52 are positioned in vertical alinement with each other, and the respective upper and lower tines of both yokes 52 are in horizontal alinement. Said cylindrical portions 53 are each provided with a rearwardly projecting cylindrical lug or trunnion 56, each of which are pivotally embraced by one end of a link 57. The free ends of each of said links 57 are connected pivotally to one of a pair of forwardly extending lugs or trunnions 58 which are rigidly attached to or made integral with the front face of the disc 33. Said trunnions 58 are positioned diametrically opposite to each other upon the disc 33, but are located in such a manner that when said arm 36 is at the end of its throw toward the right, or farthest from said lug 49, one of the trunnions 58 will be above and the other below the axis of the shaft 32.

It may be understood by the foregoing description with respect to said element B, that when the arm 36 is at the left hand end of its throw, the yokes 52 will be at the outer end of their throw upon said rod 50, and that by moving the arm 36 to the right, said yokes 52 will be moved toward each other upon said rod 50. Also that by the action of spring 47, handle 46, link 48, pawl 45, and rack 44, said yokes 52 will be held against any movement away from each other until said handle 46 is compressed against the arm 36 and pawl 45 is thus released from its engagement with said rack 44.

Referring now more particularly to Figs. 6 to 14 inclusive, a description will be made of said element A, which is designed to fit and operate within the element B.

Said element A comprises a shaft 61, in length slightly less than the distance between said ends 20 and 21 of the element B, and in diameter equal to the diameter of any shaft for which it is desired to pour a bearing. The opposite ends of the shaft 61 are axially bored superficially as shown at 62 so that they may be engaged by the pointed inner ends of said spindles 28 and may be rotatably supported thereby. A rod or handle 88 is provided for partially rotating said shaft 61 manually. The central bottom portion of said shaft 61 as shown in Fig. 6, is removed. This removed portion forms a flat face 63 and perpendicular shoulders 64 at each end thereof. Said face 63 lies parallel with the axis of the shaft 61, but is on a plane slightly offset from the plane of said axis. Longitudinally of said shaft 61 is provided a pair of rectangular grooves 65 which are parallel to the axis of the shaft 61 but which lie in a plane between the plane of the axis and the plane of said face 63. Communicating with the outer edges of each of said grooves 65, are provided grooves 66 which are of less depth than the grooves 65.

A pair of flat rectangular plates 67 one of which is shown in Fig. 12, are provided for insertion one edge of each in each of said grooves 65 at a longitudinal point of the groove which will bring the plates 67 between said shoulders 64. Said plates 67 are each held in place by a pair of countersunk stud-bolts 68 through the face 63 of said shaft 61 and through a pair of perforations 69 in each of the plates 67. The free edge of each of said plates 67 is grooved or notched transversely as shown at 70.

In Fig. 13 is shown a block 71, which is rectangular in form and which bears a flat bottomed straight sided groove 72 upon one face. Said groove 72 extends across the block 71 at an angle as is clearly shown. One edge of said block 71 is provided with a projecting longitudinal lip 73. In Fig. 14 is shown a small disc or roller 74 which has a diameter slightly less than the width of said groove 72 in the block 71. One face of said disc 74 is provided axially with a perpendicular spindle 75, the diameter of which is slightly less than the width of the notch 70 in said plate 67, and the length of which is somewhat greater than the combined depth of the groove 72 and the thickness of said plate 67.

One of said discs 74 is placed in the groove 72 in each one of a pair of the blocks 71, and when in such a position, the spindles 75 are inserted through one of said notches 70 in each of the plates 67, and said lip 73 on the edge of each of the blocks 71 is placed in one of said grooves 65 of the shaft 61. A rectangular plate 76, which is detailed in Fig. 10, is then attached to both of said blocks 71 by a plurality of screws, or the like, 77 through perforations 78. This arrangement brings the grooved face of the block 71 into slidable contact with said plates 67, and plate 76 holds the blocks 71 rigidly in position with their respective lips 73 slidably engaged in said grooves 65 of the shaft 61. It may be seen that any movement of said plate 76 and the consequent movement of both of the blocks 71 in a direction longitudinally of the shaft 61, will cause a movement of the discs 74 and spindles 75 in a direction transverse to said shaft 61. This is due to the action of the grooves 72 upon said discs 74 and also to the action of the spindles 75 which are confined in said grooves 70 in the plates 67. The movement of said spindles 75 will be simultaneous, and in a direction either directly toward or away from each other, according to the direction in which the plate 76 and said blocks 71 are moved. As a means for expediting the manual movement of the plate 76, it is provided with a projection 79.

At a point substantially medial between said shoulders 64 of the shaft 61, and perpendicular to said face 63 of the cut away portion of the shaft, is provided a bore 80 which extends from the face 63 through said shaft 61. Said bore 80 is cylindrical in the portion lying nearest the face 63, but is gradually reduced as shown at 81, causing its orifice 82 which lies farthest from said face 63 to be considerably smaller in diameter than the orifice at the face 63. Said plate 76 is centrally provided transversely with an elongated arcuate ended perforation 83 which is of a width equal to that of the larger orifice of said bore 80, and is of a length sufficient to permit the movement of the plate 76 from one of said shoulders 64 to the other without obstructing the bore 80.

In Fig. 11 is shown one of a pair of clamping collars 84. Each of the collars 84 has a central longitudinal bore of a diameter slightly greater than the diameter of said shaft 61. One end of said collar 84 is provided with alined slots 85 which are of a width slightly greater than the combined thickness of the plates 67, block 71, and said plate 76. Adjacent its other end, said collar 84 is provided with a superficial, annular, straight sided groove 86, the width of which is slightly greater than the thickness of the tines 55 of said yoke 52. The portion of said collar 84 which is surrounded by the groove 86 is of a diameter slightly less than the distance between the outer ends of the tines 55. Said collars 84 are each slidably disposed upon shaft 61 between the outer edges of said plates 67 and the ends of the shaft 61, and are prevented from movement off of said shaft 61 by a protruding screw 87 on one end of the shaft, and a perpendicularly extending rod 88 on the other end.

It may be seen that when said collars 84 are rotated to a proper radial position, they may be moved toward each other sufficiently to cause the notches 85 to partially envelop the plates 67, blocks 71, and the plate 76, and when in such position, said plate 76, and blocks 71 may be moved longitudinally of the shaft 61 without interference from the collars 84.

In installing said element A within the element B, the only operation necessary is to unscrew the spindles 28 sufficiently to clear the ends of said shaft 61, then to insert the element A within the housing in a manner bringing the shaft 61 into axial alinement with said spindles 28, and to then tighten the spindles 28 until their points engage the superficial bores 62 in the ends of said shaft 61. During this operation, the collars 84 must be positioned radially so that said notches 85 will partially envelop the plates 67, and must be so spaced upon said shaft 61 that the tines 55 of yokes 52 will register with the annular grooves 86. It may be understood that said yokes 52 are so spaced from each other on the rod 50, that when said tines 55 are engaged within the grooves 86, said collars 84 will be so positioned that their adjacent ends will engage slightly the outer edges of the plates 67. In other words the outer edges of the plates 67 will extend slightly into the notches 85 in the collars when the yokes 52 are at the outer end of their throw. This then will prevent any rotation of said collars 84 upon the shaft 61 after said element A has been properly installed within the housing B. This installation is clearly brought out in Figs. 15 and 18 of the drawings.

As previously described herein, the movement of said lever arm 36 accomplishes the movement of the yokes 52 upon the rod 28 toward and away from each other. Consequently, when the tines 55 are in engagement with said collars 84, the movement of said lever arm 36 will accomplish the movement of the collars 84 upon said shaft 61 toward and away from each other. It has also been previously described herein that the movement of said plate 76 and blocks 71 longitudinally of the shaft 61 would cause a movement of said spindles 75 toward or away from each other.

Said spindles 75 and the collars 84 are the means by which the bearing which is to be poured is properly positioned and held during the pouring operation.

Referring now more particularly to Figs. 15 to 18 inclusive, a description will be made of the operation of the device.

In Fig. 15 said shaft 61 is shown in a radial position which brings the rod 88 to a substantially vertical position, or one in which the rod 88 will contact and rest against the front edge of said top 23 at the point at which the top 23 is cut away as shown at 24. When said shaft 61 is in this radial position, the orifice 82 of said bore 80 will be pointed upwardly, and the spindles 75 of said rollers 74 will also be pointed upwardly, as best shown in Fig. 6 with the projection 79 of said plate 76 extending toward the open front of the housing.

With the device positioned as last above described, said projection 79 will first be moved to the left hand end of its throw, looking from the front of the device toward the rear. This will move the spindles 75 to their farthest possible position from each other. Said lever arm 36 will then be moved to the end of its throw toward the left end of the device, or into contact with the lug 49. This will move the yokes 52 and said collars 84 to their outermost position.

When these two operations have been accomplished, the device will be in readiness to receive a usual semi-cylindrical bearing-cap 90 and its two semi-annular side forms 91, one of which is shown in detail in Fig. 19. Said bearing-cap 90 will be placed over the central portion of the shaft 61 with its lower portions or ends resting flatly upon the upper faces of said plates 67 and with its body curved upwardly over, but not in contact with the shaft 61, and with its ends lying between said spindles 75. One of the side forms 91 will next be placed over said shaft 61 adjacent each side of the bearing-cap 90.

Each of said side forms 91 comprises a semi-annular member having its inside curved edge 92 formed at a radius equal to the radius of said shaft 61, and having a semi-annular groove 93 cut in the inner edge of one of its faces.

When the forms 91 are placed over said shaft 61, their grooves 93 will be faced toward the bearing 90, and their inner edges 92 will contact and exactly conform to the periphery of said shaft 61.

Said projection 79 will next be moved to the right until the spindles 75 contact both ends of said bearing-cap 90, at which time the bearing-cap will have been forced into a position bringing its ends to an exactly equal distance from the periphery of the shaft 61. Said lever arm 36 will then be moved toward the right, thus simultaneously closing the collars 84 against the outer faces of said forms 91 and forcing the forms into positive contact with the sides of the bearing-cap 90. In this operation said pawl 45 will engage the teeth of the rack 44 and will therefore hold the bearing-cap 90 and forms 91 rigidly in position. If the width of said bearing-cap 90 is such that said pawl 45 does not exactly register with one of the valleys between the teeth on said rack 44 when the bearing-cap and forms are pressed tightly together, manual pressure may be exerted upon said lever arm 36 sufficient to compress the spring 41 and thus make it possible for the pawl 45 to engage in the next adjacent valley between the teeth of the rack 44.

When bearing-cap 90 and forms 91 have been thus rigidly clamped between said collars 84, said rod 88 is pulled forward and downward until it is extending substantially in an inverted position, as illustrated in Fig. 18. This last mentioned operation rotates the shaft 61 upon said spindles 28, and also rotates said collars 84 in the yokes 52, which brings said face 63 of said shaft 61 into an upwardly facing position, thus exposing the larger orifice of said bore 80 through the cut away portion 24 of the top 23. The element A, when thus positioned, retains the bearing-cap 90 in a position to receive the molten bearing metal through said bore 80 in the shaft 61. The cavity for receiving the bearing metal is bounded at its top by the cylindrical central portion of said shaft 61 and a portion of the face of the plates 67, and ends by the arcuate inner surface of said bearing-cap 90, and on its sides by the forms 91. This cavity is shown in Fig. 17 as being full of bearing metal 99.

In Fig. 16 is illustrated a funnel 94 which comprises a hollow cylindrical bowl 95 having its upper end slightly flared, and having its lower end formed as a truncated cone. The lower end of said bowl 95 has a thick bottom 96 which is pierced by a pair of small parallel perforations 97, and its upper end is provided with a perpendicularly outstanding handle 98. The conical portion of the bowl 95 is of a proper size to coincide with said portion 81 of the bore 80, and the exterior diameter of the cylindrical portion of the bowl 95 is substantially equal to the diameter of the larger portion of said bore 80.

The bearing pouring operation merely consists of inserting the lower portion of said bowl 95 into the bore 80 and pouring the bearing material into the funnel. After the bearing material has had sufficient time to cool and harden, bowl 95 may be rotated within the bore 80 and said perforations 96 in its point will sever the connection between the bearing and the metal in bowl 95, after which the funnel may be removed. The poured bearing and bearing cap may then be removed by swinging the rod 88 upward into its original position, releasing the pawl 45 from its engagement with said rack 44, and moving said lever arm 36 to the right hand end of its throw.

It may here be stated that the complete operation as above described will ordinarily consume less than two minutes time, and that the operation of the device does not require a skilled workman in order to produce an excellent bearing, also that the device may be used for pouring a bearing in either a bearing cap or a bearing block.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A moulding device for bearings, embodying a housing, a cylindrical bore pivotally mounted in said housing, means including a pair of slidable pins for positioning a bearing cap in spaced relation to and in axial alinement with said core, said core having slidable collars thereon for closing the sides of said cap, and means including a single lever for clamping said cap and said collars rigidly in position for the cap to receive a bearing material.

2. A moulding device for bearings, embodying a housing, a cylindrical core pivotally mounted in said housing, means including a pair of slidable pins for positioning a bearing cap over said core in axial alinement therewith and in spaced relation thereto, said core having slidable collars thereon for closing the space between the ends of said cap and the surface of said core, means including a single lever for moving said collars toward and away from said cap, means for inverting said core and said cap, means communicating from the exterior of said cap with the space between said cap and said core, and means for directing a bearing material into said last named space.

3. A moulding device for bearings, embodying a housing having an open front and adapted to be rigidly attached to a base, a cylindrical core pivotally mounted in said housing, a flat plate connected to each side of said core and extending outwardly therefrom in alinement with each other, a pair of alined pins each protruding upwardly through one of said plates, said pins for engaging the ends of a bearing cap while it rests over said core with one of its ends on each of said plates and while so disposed for positioning said cap in axial alinement with and in spaced relation to said core, means for simultaneously moving said pins toward and away from the sides of said core, a pair of removable side forms for closing the space between the sides of said cap or block and the upper periphery of said core, a pair of collars slidably mounted upon said core each adapted to be moved toward each other and into contact with the outer side of one of said side forms for pressing the forms tightly against the sides of said cap, and means carried by said housing for moving said collars toward and away from said forms and for holding them in a desired position.

4. Organization as described in claim 3, in which the last named means comprises a pair of yokes slidably mounted on a rod carried by said housing parallel to said core, said yokes engaging said collars to move them longitudinally of said core, but permitting their independent rotation, a disc rotatably carried by the inner end of a shaft extending outwardly through the rear wall of said housing adjacent said shaft, a first lever arm rotatably mounted on the outwardly extending portion of said shaft, means carried by said arm for engaging said rack and holding said arm in a desired position, a second lever arm rigidly attached to said shaft, and means for moving said second arm with said first arm in both directions of its throw, but allowing a slight movement of said first arm in one direction independently of said second arm.

5. In a moulding device for bearings, including a core over which the bearing member which receives the bearing material is adapted to be placed, an alining mechanism for axially alining the bearing member with the core, which consists of a pair of members carried by the core, one each upon each side of the axis of the core, for engaging the bearing member, and means for moving said members toward and away from the axis of the core.

6. Organization as described in claim 5, in which the pair of members consists of upstanding pins each adapted to engage an opposite side of the bearing member.

CLAIR A. NICKLES.